US 8,219,113 B2

(12) United States Patent
Miyano

(10) Patent No.: US 8,219,113 B2
(45) Date of Patent: Jul. 10, 2012

(54) NETWORK ASSISTED MOBILE COMMUNICATION TERMINAL AND NETWORK ASSISTED GLOBAL POSITIONING METHOD FOR MOBILE COMMUNICATION TERMINAL

(75) Inventor: Akifumi Miyano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 576 days.

(21) Appl. No.: 12/390,188

(22) Filed: Feb. 20, 2009

(65) Prior Publication Data

US 2009/0215468 A1  Aug. 27, 2009

(30) Foreign Application Priority Data

Feb. 21, 2008  (JP) ................................. 2008-040402

(51) Int. Cl.
*H04W 24/00* (2009.01)
(52) U.S. Cl. ............... 455/456.1; 455/432.1; 455/435.2; 455/436; 455/440; 370/331
(58) Field of Classification Search ............... 455/456.1, 455/432.1, 435.2, 436, 440; 370/331
See application file for complete search history.

(56) References Cited

U.S. PATENT DOCUMENTS

| 6,032,042 | A   | * | 2/2000  | Kauppi ....................... 455/432.3 |
|-----------|-----|---|---------|------------------------------------------|
| 6,360,098 | B1  | * | 3/2002  | Ganesh et al. ................. 455/436  |
| 7,596,376 | B2  | * | 9/2009  | Calhoun et al. ............... 455/436   |
| 2002/0080063 | A1 |  | 6/2002  | Bloebaum |
| 2002/0082017 | A1 | * | 6/2002  | Hattori ............................. 455/436 |
| 2003/0027582 | A1 | * | 2/2003  | Hayashida ...................... 455/456 |
| 2003/0100313 | A1 | * | 5/2003  | Ogino et al. ................... 455/456 |
| 2004/0179492 | A1 | * | 9/2004  | Zhang et al. ................... 370/331 |
| 2005/0037756 | A1 | * | 2/2005  | Yaguchi et al. ............... 455/436 |
| 2005/0122259 | A1 |  | 6/2005  | Sairo |
| 2005/0239459 | A1 | * | 10/2005 | Katoh ......................... 455/432.1 |
| 2007/0087752 | A1 | * | 4/2007  | Voyer et al. .................... 455/436 |
| 2007/0123272 | A1 | * | 5/2007  | Ida et al. ..................... 455/456.1 |
| 2008/0125115 | A1 | * | 5/2008  | Kono et al. .................... 455/433 |
| 2008/0214213 | A1 | * | 9/2008  | Etemad et al. ............. 455/456.6 |
| 2009/0124261 | A1 | * | 5/2009  | Shimomura ................. 455/436 |
| 2010/0118725 | A1 | * | 5/2010  | Chiou et al. .................. 370/252 |

(Continued)

FOREIGN PATENT DOCUMENTS

EP  1 548 456  6/2005

(Continued)

OTHER PUBLICATIONS

European Search Report dated Jun. 15, 2009.

(Continued)

*Primary Examiner* — Rafael Pérez-Gutiérrez
*Assistant Examiner* — Allahyar Kasraian
(74) *Attorney, Agent, or Firm* — Dickinson Wright PLLC

(57) ABSTRACT

When a GPS terminal (8) is located in a cell (1), positioning is performed by acquiring cell information and position information (ResPos) of the cell (1). Furthermore, since the ResPos acquired by the GPS terminal (8) in the cell (1) includes surrounding cell information about surrounding cells (cell 2 to cell 7), the surrounding cell information is also stored in the GPS terminal (8) in association with the ResPos acquired in the cell (1). When the GPS terminal (8) moves between a plurality of cells, positioning is performed using the ResPos stored in the cell (1) as is if the number of handovers is smaller than a predetermined threshold. On the other hand, if the number of handovers exceeds a predetermined threshold, positioning is performed using the ResPos acquired in the destination cell.

8 Claims, 8 Drawing Sheets

U.S. PATENT DOCUMENTS

2010/0253577 A1* 10/2010 Fujiwara et al. .......... 342/357.42
2010/0273488 A1* 10/2010 Kim .............................. 455/436
2011/0124341 A1* 5/2011 Kubo et al. ................... 455/440

FOREIGN PATENT DOCUMENTS

| | | |
|---|---|---|
| JP | 2005-083859 | 3/2005 |
| WO | 2004-097445 | 11/2004 |
| WO | 2007-069363 | 6/2007 |

OTHER PUBLICATIONS

"3rd Generation Partnership Project: Technical Specification Group GSM EDGE Radio Access Network; Location Services (LCS); Broadcast Network Assistance for Enhanced Observed Time Difference (E-OTD) and Global Positioning System (gps) Positioning Methods (Release 1999)," 3GPP TS 04.35 V8.3.0, Jan. 2001, pp. 1-35.

* cited by examiner

NETWORK ASSISTED MOBILE COMMUNICATION TERMINAL AND NETWORK ASSISTED GLOBAL POSITIONING METHOD FOR MOBILE COMMUNICATION TERMINAL

CROSS REFERENCE TO RELATED APPLICATIONS

The disclosure of Japanese Patent Application No. 2008-40402, filed on Feb. 21, 2008, including the specification, drawings and abstract, is incorporated herein by reference in its entirety.

BACKGROUND OF THE INVENTION

1. Field of the Invention

The present invention generally relates to mobile communication terminals having functions for reporting position information. More particularly, the present invention relates to a mobile communication terminal with an SPS (Satellite Positioning System) receiver for positioning, and a positioning method of the mobile communication terminal.

2. Description of the Related Art

Conventionally, a mobile communication terminal with an SPS receiver performs positioning of mobile communication terminals using reference position information (hereinafter "RefPos"), which is one kind of assisting information. This RefPos indicates a rough position of the mobile communication terminal (for example, the position of the base station of the mobile telephone). When performing positioning, the mobile communication terminal stores the cell ID of the base station in association with RefPos, and therefore is able to reuse the positioning information from the previous RefPos as is, if the cell ID doe not change before and after move. That is, if the cell ID does not change from the previous positioning, the mobile communication terminal can use RefPos information it stores as is. By this means, the frequency the mobile communication terminal has to access the server during positioning can be reduced (e.g., see Japanese Patent Application Laid-Open No. 2005-83859).

However, the accuracy required of RefPos is generally on the order of 150 kilometers, which is substantially greater than the cell radius of the base station. Therefore, the mobile communication terminal can still use the same RefPos even when the mobile communication terminal moves to a neighboring cell (that is, to a neighboring base station). However, the SPS receiver in a conventional mobile communication terminal accesses the server and acquires RefPos when performing positioning in the stage the mobile communication terminal has moved to a neighboring cell (i.e. base station), and therefore unnecessary access to the server occurs. That is, when the mobile communication terminal moves, the mobile communication terminal has to access the server more often. In other words, when moving to a neighboring cell (i.e. base station) and performing positioning, the mobile communication terminal decides that RefPos is invalid when the RefPos really is still valid, and access the network. This results in increased load on the network, increased load on the server or increased cost of packets, leading to a problem that the operability of the mobile communication terminal deteriorates.

SUMMARY OF THE INVENTION

The present invention provides a mobile communication terminal and a positioning method for the mobile communication terminal, whereby accurate positioning is made possible by adequately deciding whether assisting information (e.g. RefPos) is valid or invalid and reducing the frequency of access to the network.

One aspect of the mobile communication terminal of the present invention provides a mobile communication terminal that acquires position information of a cell to which the mobile communication terminal currently belongs, from a network with which position information of a plurality of cells constituting a wireless area is registered, and this mobile communication terminal achieves the above object of the invention by providing: a communication section that receives, in each cell, position information about the cell to which the mobile communication terminal currently belongs, and cell information for identifying the cell; a storage section that associates and stores the position information and the cell information received in the communication section; a counter that counts the number of handovers that take place upon move between cells providing different cell information; a global positioning system section that performs global positioning system positioning based on the position information; and a control section that decides whether the position information stored in the storage section is valid or invalid, based on the number of handovers counted on the counter.

Furthermore, one aspect of the mobile communication terminal of the present invention provides a mobile communication terminal that acquires position information of a cell to which the mobile communication terminal currently belongs, from a network with which position information of a plurality of cells constituting a wireless area is registered, and this mobile communication terminal achieves the above object of the invention by providing: a communication section that receives, in each cell, position information about the cell to which the mobile communication terminal currently belongs, cell information for identifying the cell, and surrounding cell information about surrounding cells located around the cell; a storage section that associates and stores the position information and the cell information received in the communication section, and the surrounding cell information; a global positioning system section that performs global positioning system positioning based on the position information; and a control section that decides whether the position information stored in the storage section is valid or invalid, based on a result of comparison between the cell information about the cell to which the mobile communication terminal currently belongs, received in the communication section, and the cell information and the surrounding cell information stored in the storage section.

Furthermore, one aspect of the positioning method for a mobile communication terminal of the present invention provides a positioning method for a mobile communication terminal that acquires position information of a cell to which the mobile communication terminal currently belongs, from a network with which position information of a plurality of cells constituting a wireless area is registered, and this positioning method achieves the above object of the invention by providing: a receiving step of receiving, in each cell, position information about the cell to which the mobile communication terminal currently belongs, and cell information for identifying the cell; a storing step of associates and stores the position information and the cell information received in the receiving step; a counting step of counting the number of handovers that take place upon move between cells providing different cell information; a global positioning system positioning step of performing global positioning system positioning based on the position information; and a deciding step of deciding whether the position information stored in the storing step is valid or invalid, based on the number of handovers.

Furthermore, another aspect of the positioning method for a mobile communication terminal of the present invention is a positioning method for a mobile communication terminal that that acquires position information of a cell to which the mobile communication terminal currently belongs from a network with which position information of a plurality of cells constituting a wireless area is registered, and this positioning method achieves the above object of the invention by providing: a receiving step of receiving, in each cell, position information of a cell to which the mobile communication terminal currently belongs, cell information for identifying the cell, and surrounding cell information about surrounding cells located around the cell; a storing step of associating and storing the position information, the cell information and the surrounding cell information, received in the receiving step; a global positioning system positioning step of performing global positioning system positioning based on the position information; and a deciding step of deciding whether the position information stored in the storing step is valid or invalid, based on a result of comparison between the cell information about the cell to which the communication section currently belongs, received in the receiving step, and the cell information and the surrounding cell information stored in the storing step.

According to the present invention, whether assisting information (e.g., RefPos) is valid or invalid is decided adequately while a mobile communication terminal is moving, and, if assisting information is valid, positioning is performed by reusing the original assisting information. By this means, the number of times to access the network or server during positioning is reduced, so that it is possible to reduce the load on the network, reduce the load on the server and reduce the cost of packets.

DETAILED DESCRIPTION OF THE PREFERRED EMBODIMENTS

<Overview of Invention>

An SPS receiver in a mobile communication terminal acquires assisting information from a server in the network, and improves positioning performance. In this case, if assisting information acquired before positioning is still valid, it is possible to perform positioning using assisting information acquired earlier, without newly accessing the server. Therefore, by adequately deciding whether assisting information is valid or invalid, it is possible to reduce the number of times to access the server and perform more accurate positioning.

Therefore, the SPS receiver provided in the mobile communication terminal of the present invention is designed to reduce the frequency to access the server, reduce the load on the network and reduce the cost of packets, by adequately deciding whether assisting information (e.g., RefPos) is necessary or unnecessary. To be more specific, the SPS receiver counts the number of times the mobile communication terminal performs handovers, estimates the distance the mobile communication terminal moves, and decides whether RefPos, which shows a rough position of the mobile communication terminal (e.g. the position of the base station of the mobile telephone), is valid or invalid. That is, if the number of times a handover has been performed since RefPos was acquired previously is equal to or less than a predetermined threshold, the previous RefPos is used as is to perform positioning, whereas, if the number of times a handover has been performed exceeds the predetermined threshold, newly acquired RefPos is used to perform positioning.

(Embodiment 1)

Figure 1:
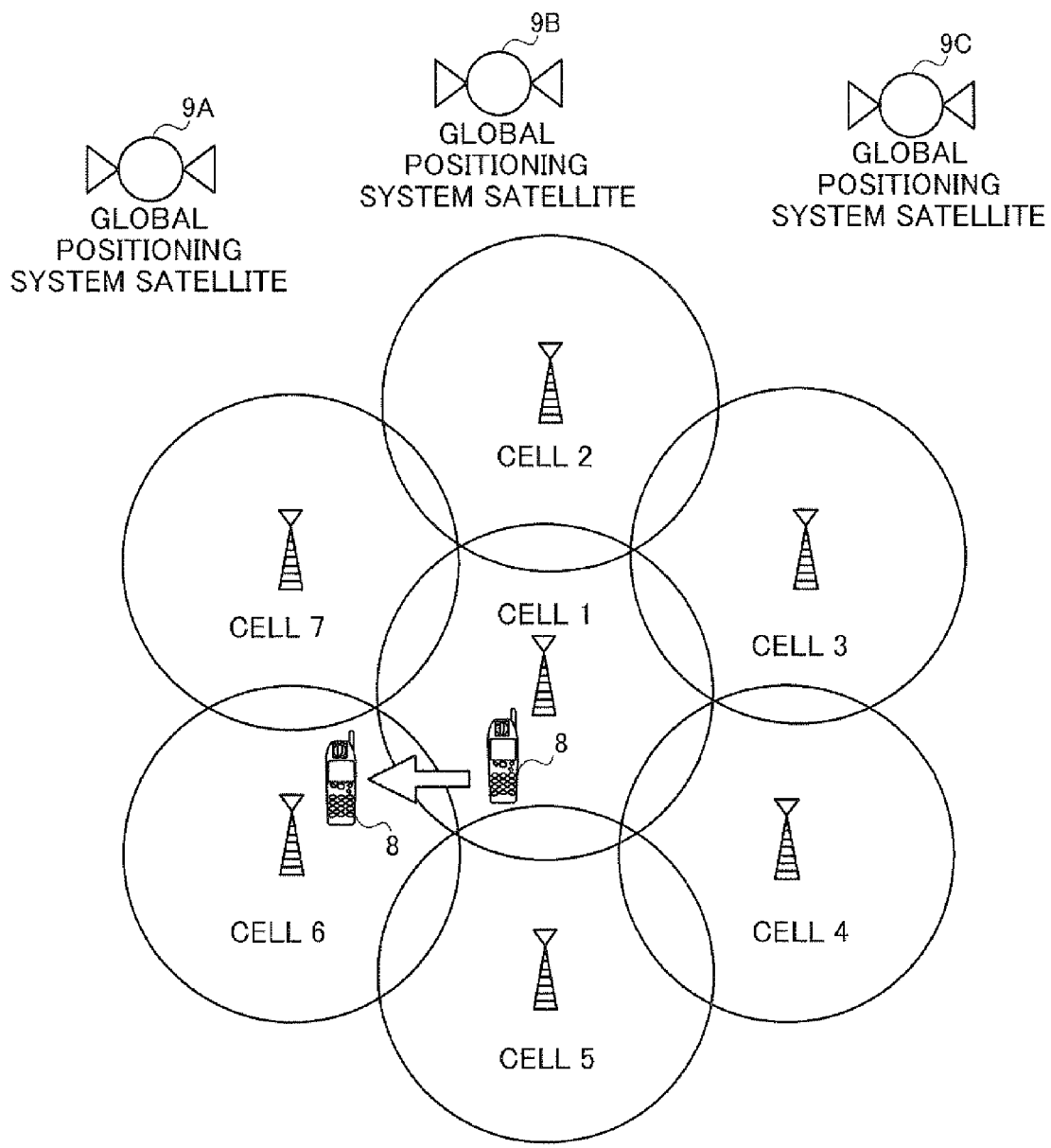
FIG. 1 is a conceptual diagram showing how a mobile communication terminal according to the present invention moves between a plurality of cells (base stations)

FIG. 1 is a conceptual diagram showing how a mobile communication terminal according to the present invention moves across a plurality of cells (i.e. base stations). In FIG. 1, there are cell 2, cell 3, cell 4, cell 5, cell 6 and cell 7, around cell 1. Also shown in FIG. 1 are Global Positioning System (hereinafter, also referred to as "GPS") satellite 9A, UPS satellite 9B and GPS satellite 9C. Furthermore, mobile communication terminal 8 (hereinafter "network assisted GPS terminal," also abbreviated as "GPS terminal 8") is moving from the area of cell 1 to the area of cell 6. Furthermore, each cell (cell 1 to cell 7) is providing assisting information (that is, RefPos) to GPS terminal 8, to improve the performance of positioning by GPS terminal 8.

Next, an overview of RefPos acquiring operation that takes place when GPS terminal 8 moves between cells will be explained, When GPS terminal 8 is located in the area of cell 1, GPS terminal 8 acquires cell information and RefPos in cell 1, and performs positioning. In this case, the RefPos which GPS terminal 8 acquires in cell 1 includes surrounding cell information about surrounding cells (that is, cell 2 to cell 7), delivered from the base stations of the cells, so that GPS terminal 8 stores the surrounding cell information in association with the RefPos and cell information acquired in cell 1.

GPS terminal 8 stores the RefPos acquired in cell 1 and uses the stored RefPos as is when performing positioning in places in cell 1. Furthermore, when GPS terminal 8 moves between a plurality of cells, if the number of handovers is less than a predetermined threshold, GPS terminal 8 performs positioning using the RefPos stored in cell 1 as is. On the other hand, if the number of handovers exceeds the predetermined threshold, GPS terminal 8 performs positioning using the RefPos acquired in the destination cell.

Figure 2:
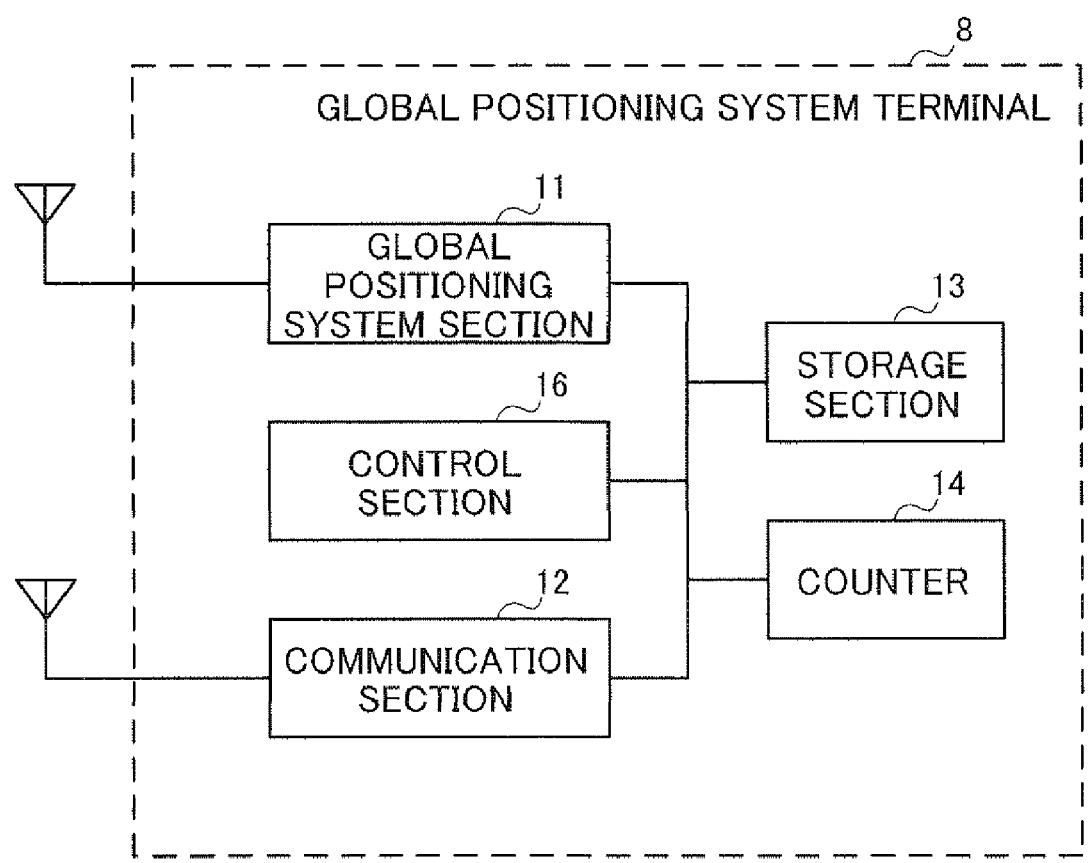
FIG. 2 is a block diagram showing a configuration of an SPS receiving section in the mobile communication terminal according to Embodiment 1 of the present invention.

FIG. 2 is a block diagram showing a configuration of an SPS receiving section in a mobile communication terminal according to Embodiment 1 of the present invention. That is, FIG. 2 is a block diagram showing the configuration of GPS terminal 8 shown in FIG. 1, and therefore the configuration and operation in FIG. 2 will be explained with reference to FIG. 1. In FIG. 2, GPS terminal 8 is comprised of GPS section 11, communication section 12, storage section 13, counter 14 and control section 16.

Communication section 12 has the function of communicating with the base station in each cell (cell 1 to cell 7), carrying out normal terminal communication and, from each cell, acquiring cell information that identifies the cells (cell 1 to cell 7). Storage section 13 has the function of storing assisting information (i.e. RefPos) acquired by communication section 12, in association with the cell information. Counter 14 has the function of counting the number of times a handover takes place when GPS terminal 8 moves between cells (cell 1 to cell 7). Furthermore, counter 14 also has the function of counting how much time has passed since GPS section 11 performed GPS positioning based on assisting information (i.e. RefPos). Control section 16 has the function of controlling the respective sections (GPS section 11, communication section 12, storage section 13 and counter 14) in GPS terminal 8. To be more specific, control section 16 has the function of deciding whether the position information stored in storage section 13 is valid or invalid, based on the number of handovers counted on counter 14.

Figure 3:
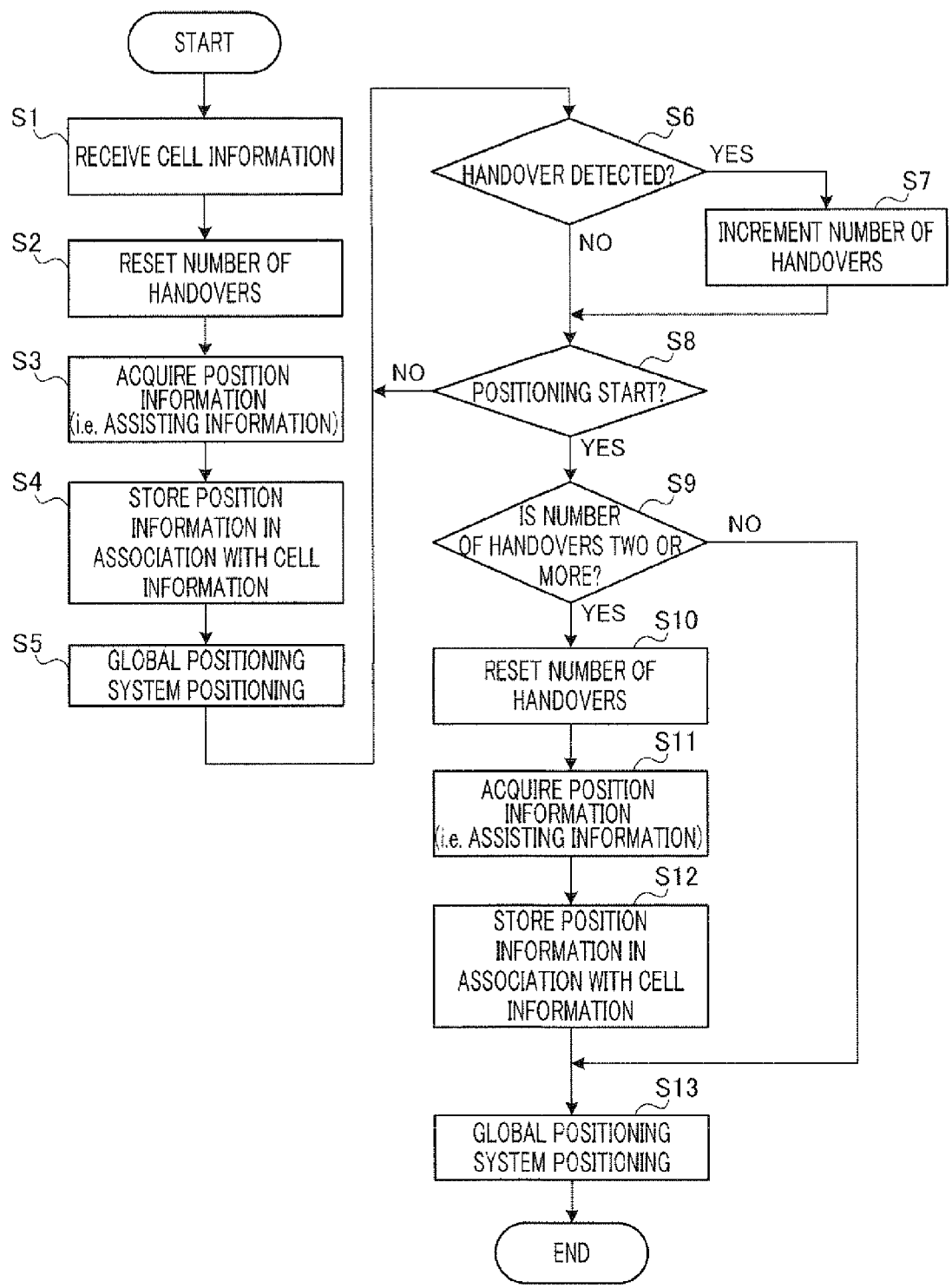
FIG. 3 is a flowchart showing a flow of positioning operation of the mobile communication terminal according to Embodiment 1 of the present invention.

Next, the operation of mobile communication terminal (GPS terminal 8) shown in FIG. 2 will be explained using a flowchart. FIG. 3 is a flowchart showing a flow of positioning operation of the mobile communication terminal according to Embodiment 1 of the present invention. Therefore, the flow in the flowchart in FIG. 3 will be explained, with reference to FIG. 1 and FIG. 2 when necessary. In the following explanations, suppose that the point from which GPS terminal 8 starts moving, is located in cell 1.

First, communication section 12 in GPS terminal 8 receives cell information (e.g., the cell ID of cell 1) from cell 1 (step S1). Next, the number of handovers on counter 14 is reset to zero (step S2). Furthermore, communication section 12 acquires RefPos as position information (i.e. assisting information) from cell 1 (step S3).

The position information (i.e. RefPos) and cell information (i.e. the cell ID) of cell 1 are then associated and stored in storage section 13 (step S4). By this means, control section 16 of GPS terminal 8 extracts the RefPos and cell ID of cell 1 stored in storage section 13 as assisting information, performs GPS positioning in the area of cell 1, and identifies its own position (step S5).

Upon detecting a handover, communication section 12 reports to counter 14 ("YES" in step S6) and increments (+1) the number of handovers on counter 14 (step S7). On the other hand, if no handover is detected, communication section 12 leaves the number of handovers on counter 14 as is ("NO" in step S6). If positioning is not started, the process returns to step S6 ("NO" in step S8), and, if positioning starts ("YES" in step S8), the process moves to step S9.

Next, control section 16 decides whether or not the number of handovers on counter 14 is two or more (that is, equal to or greater than a predetermined threshold) when GPS positioning starts (step S9). If the number of handovers is two or more (i.e. equal to or greater than a predetermined threshold) ("YES" in step S9), control section 16 resets the number of handovers on counter 14 (step S10). Furthermore, communication section 12 acquires RefPos as position information (i.e. assisting information) from the destination cell after having moved across two or more cells (step S11).

Communication section 12 then stores the position information of the destination cell (i.e. RefPos) in association with the cell information (i.e. the cell ID), in storage section 13 (step S12). By this means, control section 16 of GPS terminal 8 extracts the RefPos and cell ID of the destination cell stored in storage section 13 as assisting information, performs GPS positioning in the destination cell and identifies its own position (step S13).

On the other hand, if the number of handovers is not two or more (i.e. equal to or greater than a predetermined threshold) in step S9, that is, if the number of handovers is less than two (i.e. less than a predetermined threshold) ("NO" in step S9), control section 16 extracts the position information (i.e. RefPos) of cell 1 acquired previously, from storage section 13, without resetting the number of handovers, performs GPS positioning and identifies its own position (step S13).

In this way, if the number of handovers is two or more (i.e. equal to or greater than a predetermined threshold), control section 16 performs GPS positioning using the position information (i.e. RefPos) of the destination cell, whereas, if the number of handovers is less than two (i.e. less than a predetermined threshold), control section 16 performs GPS positioning using position information (i.e. RefPos) of the original cell (i.e. cell 1) acquired earlier and stored in storage section 13.

That is, if the number of handovers after acquiring RefPos in advance is less than a predetermined threshold, the mobile communication terminal (GPS terminal 8) does not reacquire RefPos, performs GPS positioning using the RefPos acquired earlier, and identifies its own position. On the other hand, if the number of handovers is equal to or greater than a predetermined threshold, the mobile communication terminal acquires the RefPos of the destination, performs GPS positioning, and identifies its own position. Furthermore, if the handover destination cell is the same cell from which RefPos has been acquired earlier, the number of handovers is reset. This allows the mobile communication terminal (GPS terminal 8) to minimize the number of times to access the network during positioning, and perform GPS positioning.

Next, the first modification example of Embodiment 1 will be explained. In the first modification example, communication section 12 of GPS terminal 8 acquires not only the cell information of cell 1 but also surrounding cell information of the surrounding cells (cell 2 to cell 7), and performs GPS positioning.

Figure 4:
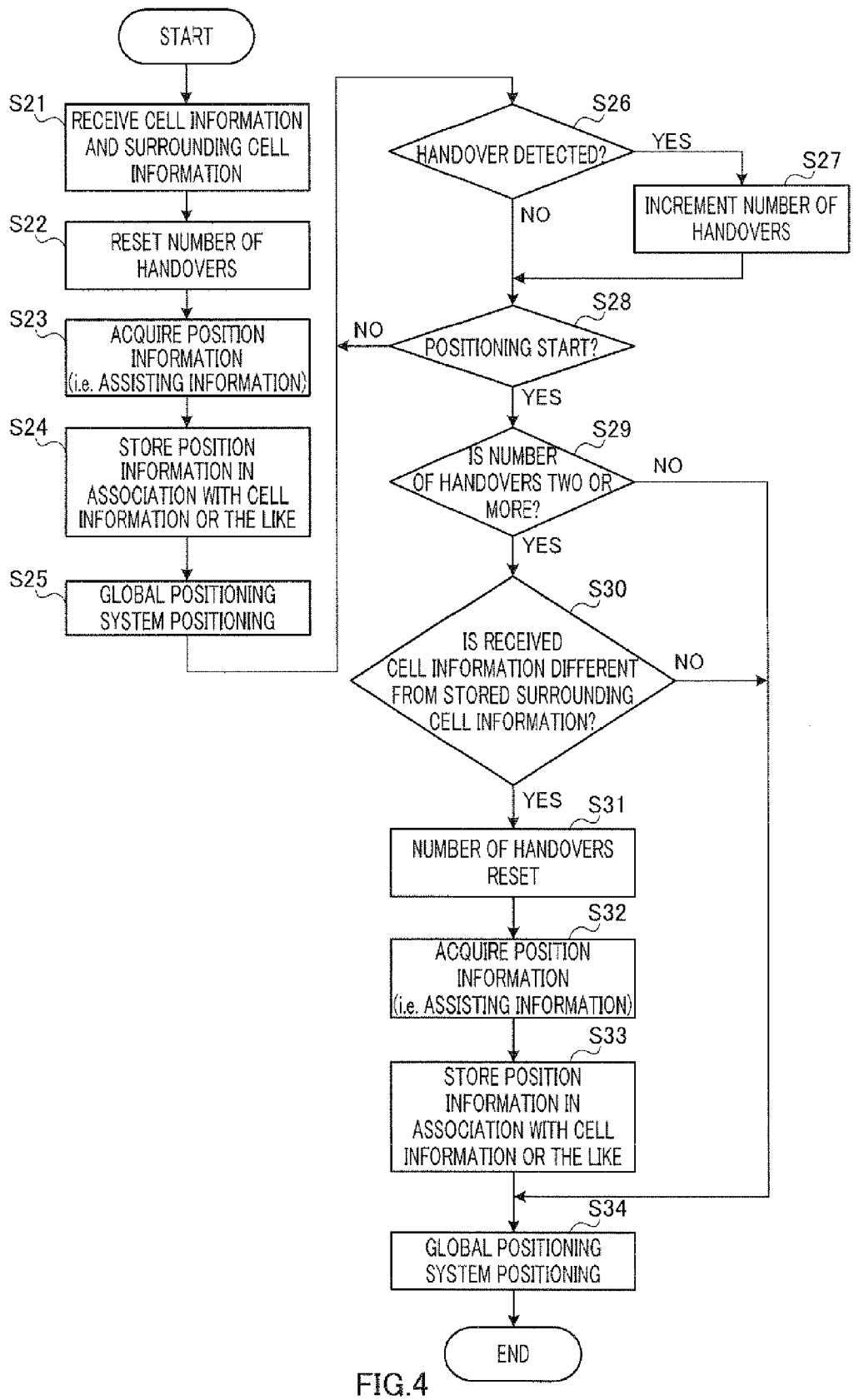
FIG. 4 is a flowchart showing a flow of positioning operation of the mobile communication terminal in a first modification example of Embodiment 1 according to the present invention.

FIG. 4 is a flowchart showing a flow of positioning operation of the mobile communication terminal in the first modification example of Embodiment 1 according to the present invention. The flowchart of FIG. 4 differs from the flowchart of FIG. 3 in acquiring information about surrounding cells in addition to information about the destination cell. However, to illustrate a flow of a series of operations, the steps of the same operation contents as those in FIG. 3 will also be explained.

In FIG. 4, communication section 12 of GPS terminal 8 receives cell information (i.e. the cell ID of cell 1) from cell 1 first, and also receives surrounding cell information (that is, the cell IDs of surrounding cells) of the surrounding cells (cell 2 to cell 7) (step S21). Next, control section 16 resets the number of handovers on counter 14 to zero (step S22). Furthermore, communication section 12 acquires RefPos from cell 1 as position information (i.e. assisting information) (step S23).

Communication section 12 then associates the position information (i.e. RefPos) and cell information (i.e. the cell ID of cell 1), associates surrounding cell information (i.e. the cell IDs of surrounding cells) with the position information and cell information, and stores these information in storage section 13 (step S24). In this way, control section 16 of GPS terminal 8 extracts the RefPos and cell ID of cell 1 stored in storage section 13 as assisting information, performs GPS positioning in the area of cell 1 and identifies its own position (step S25).

Upon detecting a handover, communication section 12 reports to counter 14 ("YES" in step S26) and increments (+1) the number of handovers on counter 14 (step S27). On the other hand, if no handover is detected, communication section 12 leaves the number of handovers on counter 14 as is ("NO" in step S26). If positioning is not started, the process returns to step S26 ("NO" in step S28), or, when positioning starts ("YES" in step S28), the process moves to step S29.

Next, control section 16 decides whether or not the number of handovers on counter 14 is two or more (that is, equal to or greater than a predetermined threshold) at the start of GPS positioning (step S29). If the number of handovers is two or more (that is, equal to or greater than a predetermined threshold) ("YES" in step S29), control section 16 decides whether or not the received cell information is different from the surrounding cell information stored in storage section 13 (step S30).

Here, if the received cell information is different from the surrounding cell information stored in storage section 13 ("YES" in step S30), control section 16 resets the number of handovers on counter 14 (step S31), and communication section 12 acquires RefPos from the destination cell after having moved across two or more cells as position information (i.e. assisting information) (step S32).

Control section 16 then associates the position information (i.e. RefPos) and cell information (i.e. the cell ID) of the destination cell, associates the surrounding cell information (i.e. the cell IDs of surrounding cells) with the position information and cell information, and stores these information in storage section 13 (step S33). In this way, control section 16 of GPS terminal 8 extracts the RefPos and cell ID of the destination cell stored in storage section 13, as assisting information, performs GPS positioning in the destination cell and identifies its own position (step S34).

On the other hand, if the number of handovers is not two or more (i.e. equal to or greater than a predetermined threshold) in step S29 ("NO" in step S29) and, if received cell information is the same as surrounding cell information stored in storage section 13 in step S30 ("NO" in step S30), control section 16 extracts the position information (i.e. RefPos) of cell 1 acquired previously from storage section 13, without resetting the number of handovers, performs GPS positioning and identifies its own position (step S34).

In this way, if the number of handovers is two or more (i.e. equal to or greater than a predetermined threshold), control section 16 performs GPS positioning according to the position information (i.e. RefPos) of the destination cell, whereas, if the number of handovers is less than two (i.e. less than a predetermined threshold), control section 16 performs GPS positioning according to the position information (i.e. RefPos) of is the original cell (i.e. cell 1) acquired earlier and stored in storage section 13.

That is, in the first modification example of Embodiment 1, storage section 13 of mobile communication terminal (GPS terminal 8) stores the position information (i.e. RefPos) of the destination cell in association with surrounding cell information. When performing positioning in the place (i.e. cell) where the cell information is stored, positioning is performed using the RefPos associated with this cell.

Next, a second modification example of Embodiment 1 will be explained. While the first modification example acquires surrounding cell information together and performs GPS positioning, the second modification example performs positioning using the positioning location obtained from the previous RefPos, if the surrounding cell information is the same as cell information that is already stored.

Figure 5:
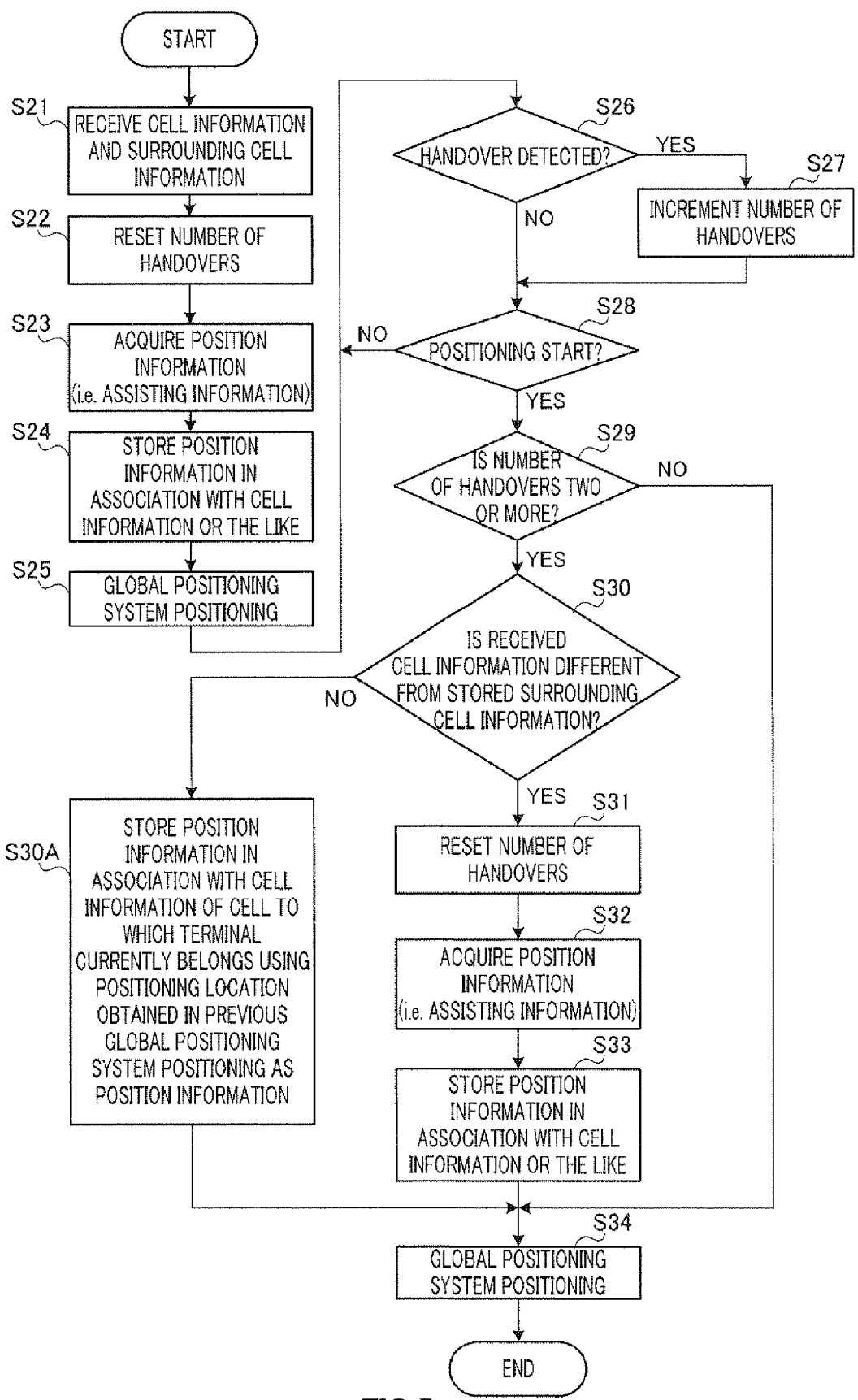
FIG. 5 is a flowchart showing a flow of positioning operation of a mobile communication terminal in a second modification example of Embodiment 1 according to the present invention.

FIG. 5 is a flowchart showing a flow of positioning operation of the mobile communication terminal in the second modification example of Embodiment 1 according to the present invention. The flowchart of FIG. 5 differs from the flowchart of FIG. 4 only in that, if surrounding cell information is the same as cell information that is stored already ("NO" in step S30) in step S30, the positioning location obtained from the previous RefPos is used as the current positioning location. Therefore, only the steps changed from FIG. 4 will be explained in detail.

That is, in step S30, it is decided whether or not received cell information is different from the surrounding cell information stored in storage section 13, and, it the received cell information is different from the surrounding cell information stored in the storage section 13 ("YES" in step S30), the number of handovers on counter 14 is reset as in the case of the first modification example. However, if received cell information is the same as surrounding cell information stored in the storage section 13 ("NO" in step S30), the positioning location obtained in the previous GPS positioning is used as the current position information (i.e. RefPos), and the position information (i.e. RefPos) is stored in association with the cell information (i.e. the cell ID) of the cell to which the terminal currently belongs, in storage section 13 (step S30a), and GPS positioning is performed (step S34).

That is, in the second modification example of Embodiment 1, storage section 13 of mobile communication terminal (GPS terminal 8) stores the RefPos acquired this time in association with the cell information of the current cell, and, if the surrounding cell information for use in the next positioning includes cell information that has been stored earlier, positioning is performed using the RefPos associated with this cell.

(Embodiment 2)

Figure 6:
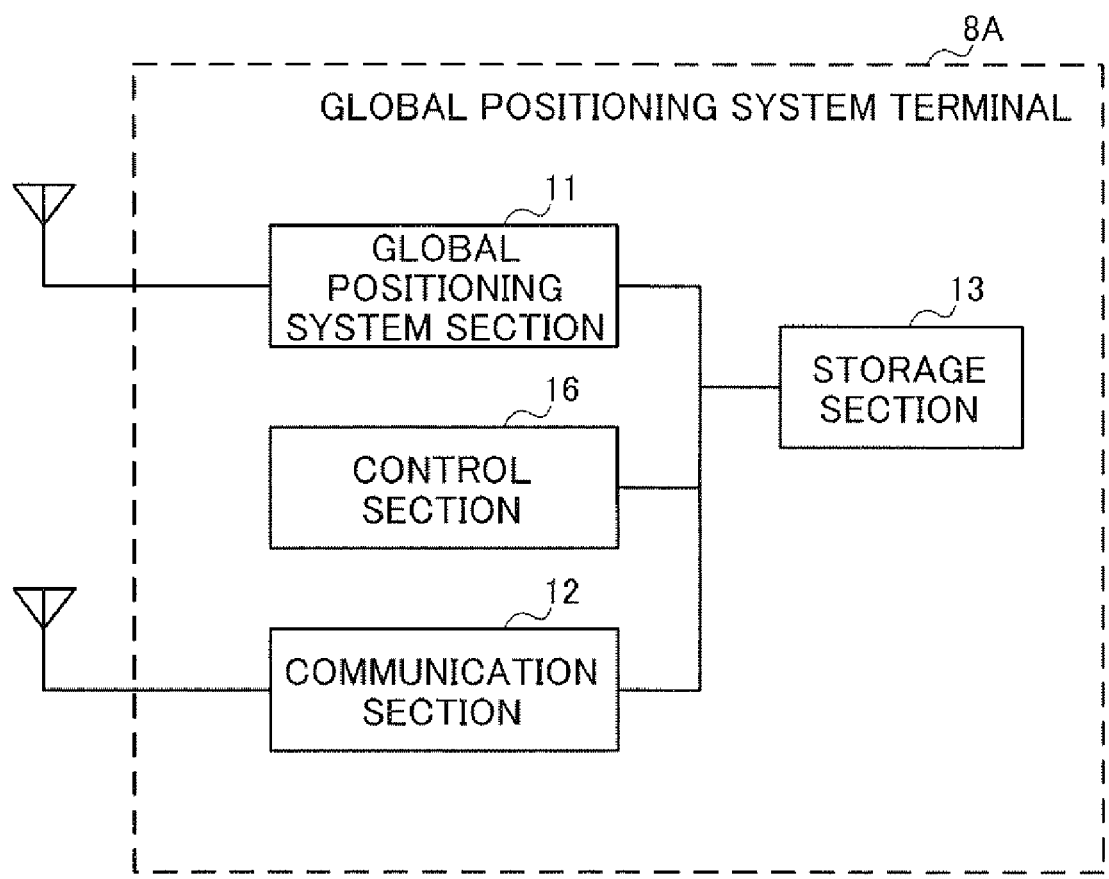
FIG. 6 is a block diagram showing a configuration of an SPS receiving section in a mobile communication terminal according to Embodiment 2 of the present invention.

Embodiment 2 will explain a mode in which GPS positioning is performed without counting the number of handovers. FIG. 6 is a block diagram showing a configuration of a mobile communication terminal according to Embodiment 2 of the present invention. That is, the mobile communication terminal (GPS terminal 8a) of Embodiment 2 shown in FIG. 6 corresponds to GPS terminal 8 of Embodiment 1 shown in FIG. 2 without counter 14. That is, UPS terminal 8a in FIG. 6 is configured by including GPS section 11, communication section 12, storage section 13 and control section 16.

Figure 7:
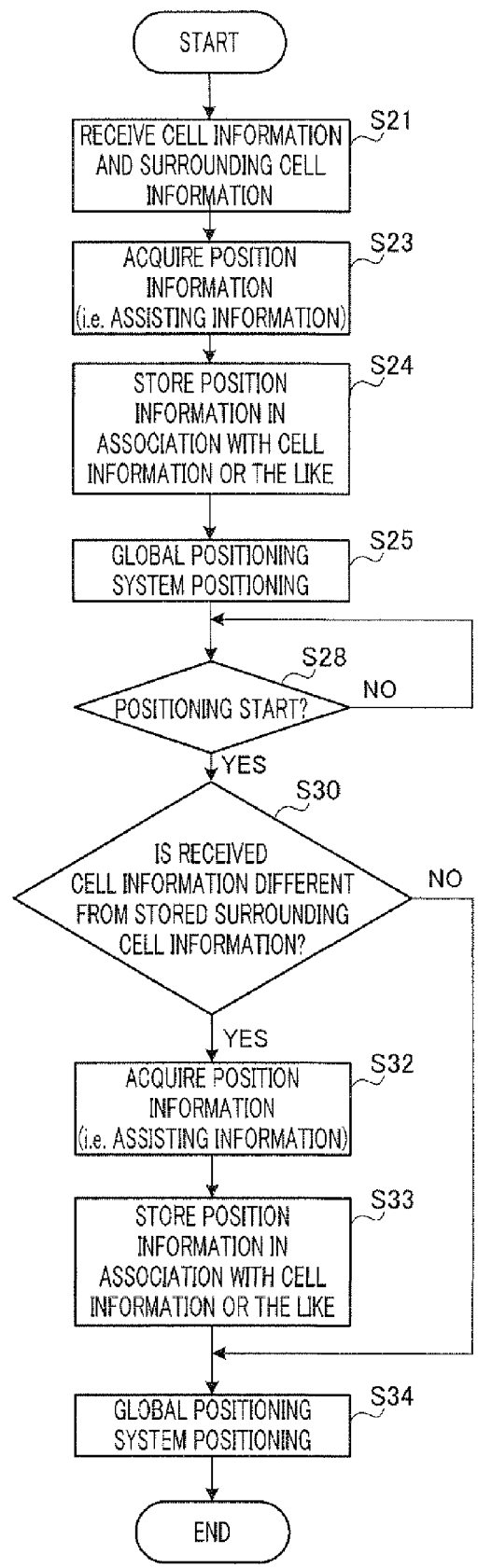
FIG. 7 is a flowchart showing a flow of positioning operation of the mobile communication terminal according to Embodiment 2 of the present invention.

FIG. 7 is a flowchart showing a flow of positioning operation of the mobile communication terminal according to Embodiment 2 of the present invention. The flowchart of FIG. 7 differs from the flowchart of FIG. 4 shown in Embodiment 1 in that the steps related to counting and resetting the number of handovers are removed. Therefore, the flowchart of FIG. 7 assigns the same reference numerals to steps of the same contents as those in FIG. 4.

That is, in FIG. 7, communication section 12 of GPS terminal 8a first receives cell information (i.e. the cell ID of cell 1) from cell 1 and receives surrounding cell information (i.e. the cell IDs of the surrounding cells) of the surrounding cells (cell 2 to cell 7) (step S21). Next, communication section 12 acquires RefPos from cell 1 as position information (i.e. assisting information) (step S23).

Communication section 12 then associates the position information (i.e. RefPos) and cell information (i.e. the cell ID of cell 1) of cell 1, associates surrounding cell information (i.e. the cell IDs of the surrounding cells) with the position information and cell information, and stores these information in storage section 13 (step S24). In this way, control section 16 of GPS terminal 8a extracts the RefPos and cell ID of cell 1 stored in storage section 13 as assisting information, performs GPS positioning in the area of cell 1 and identifies its own position (step S25).

Next, GPS terminal 8a decides whether or not to start positioning, repeats deciding whether or not to start positioning if positioning is not started ("NO" in step S28), and moves onto step S30 when positioning starts ("YES" in step S28).

Next, at the start of GPS positioning, communication section 12 of GPS terminal 8a receives cell information (i.e. the cell ID) of the destination cell and surrounding cell information (i.e. the cell IDs of the surrounding cells) again.

Control section 16 of GPS terminal 8a then decides whether or not the received cell information (that is, the cell ID of the destination cell) is different from the cell information (that is, the cell IDs of cell 1 and surrounding cells) stored in storage section 13, and decides, if the received cell information is different from the stored cell information, whether or not the received cell information is different from the surrounding cell information stored in storage section 13 (step S30).

Here, if the received cell information is different from the surrounding cell information stored in storage section 13 ("YES" in step S30), communication section 12 acquires RefPos from the destination cell after having moved across two or more cells as the position information (i.e. assisting information) (step S32). Communication section 12 then associates the position information (i.e. RefPos) and cell information (i.e. the cell ID) of the destination cell, furthermore associates surrounding cell information (i.e. the cell IDs of surrounding cells) with the position information and cell information, and stores these information in storage section 13 (step S33). In this way, control section 16 of GPS terminal 8a extracts the RefPos and cell ID of the destination cell stored in storage section 13 as assisting information, performs GPS positioning in the destination cell and identifies its own position (step S34).

On the other hand, if the received cell information is the same as cell information that is stored, and, in step S30, if the received cell information is the same as surrounding cell information stored in storage section 13 ("NO" in step S30), control section 16 extracts the position information (i.e. RefPos) of cell 1 acquired previously, from storage section 13, performs GPS positioning, and identifies its own position (step S34).

Figure 8:
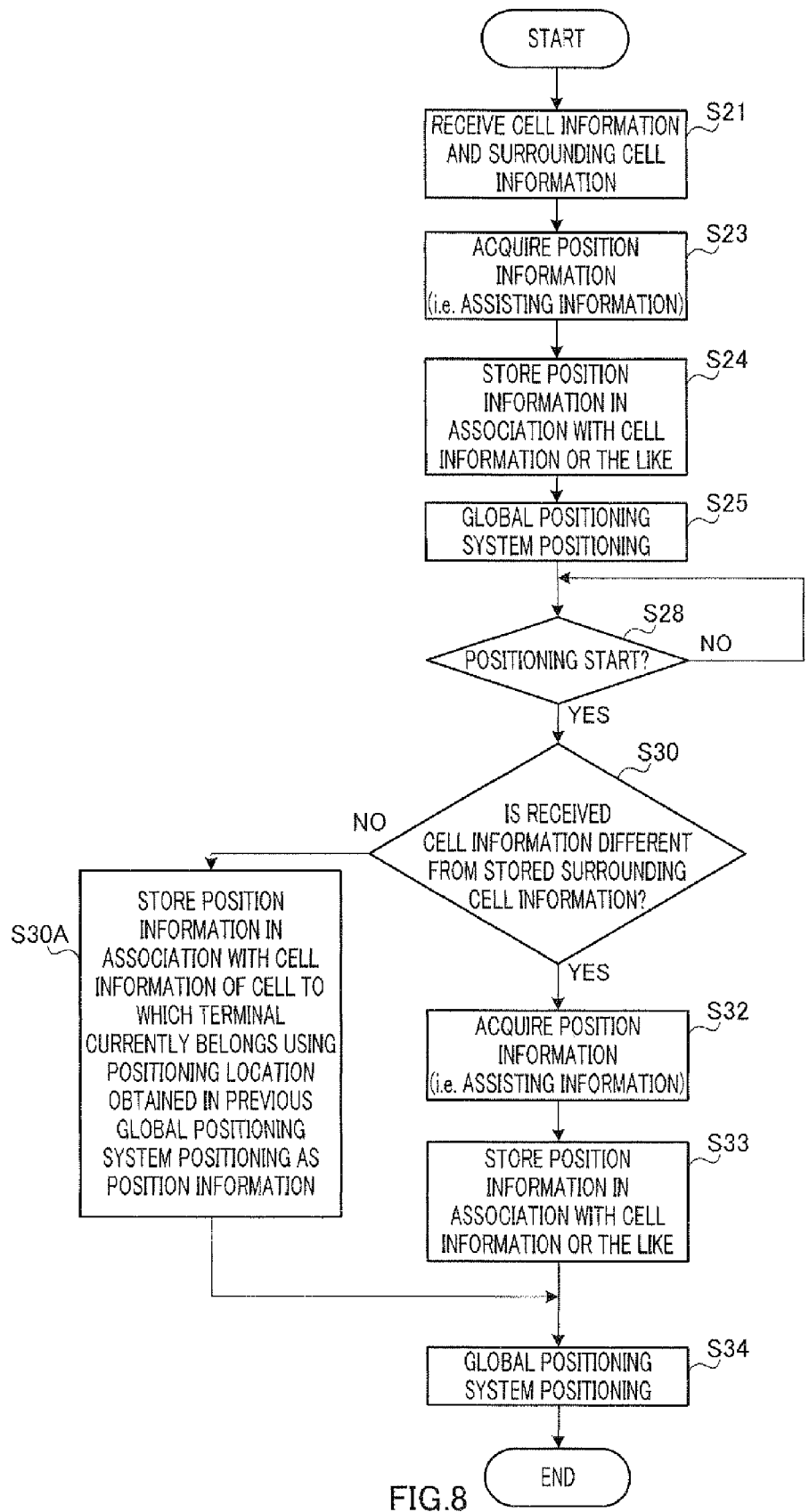
FIG. 8 is a flowchart showing a flow of positioning operation of a mobile communication terminal in a modification example of Embodiment 2 of the present invention.

FIG. 8 is a flowchart showing a flow of positioning operation of a mobile communication terminal in a modification example of Embodiment 2 of the present invention. The flowchart of FIG. 8 is different from the flowchart of FIG. 7 only in that, if surrounding cell information is the same as cell information that is already stored in step S30 ("NO" in step S30), the positioning location obtained from the previous RefPos is used as the current positioning location. Therefore, only steps changed from FIG. 7 will be explained in detail.

That is, it is decided whether or not cell information that is received is different from the surrounding cell information that is stored in storage section 13 (step S30), and, if the received cell information is different from the surrounding cell information that is stored in the storage section 13 ("YES" in step S30), communication section 12 acquires position information (i.e. assisting information) as in the case of FIG. 7. However, if cell information that is received is the same as surrounding cell information that is stored in storage section 13 ("NO" in step S30), the positioning location obtained in the previous GPS positioning is used as the current position information, the position information is stored in storage section 13 in association with the cell information about the cell to which the mobile communication terminal currently belongs (step S30a), and GPS positioning is performed (step S34).

Furthermore, as a modification example, if there are a plurality of RefPos's stored in storage section 13, an average of these RefPos's may be calculated, and an intermediate point may be calculated and used for positioning. Furthermore, the time limit may be set for the assisting information (i.e. RefPos) stored in storage section 13. Furthermore, instead of RefPos, the positioning location may be directly stored in storage section 13 and used for positioning.

As described above, the present invention adequately decides whether assisting information (e.g., RefPos) is valid or invalid while a mobile communication terminal is moving, and, if assisting information is valid, performs positioning by reusing the original assisting information. By this means, the number of times the mobile communication terminal accesses the network or server during positioning is reduced, so that it is possible to reduce the load on the network, reduce the load on the server and reduce the cost of packets.

What is claimed is:

1. A mobile communication terminal that acquires position information of a cell to which the mobile communication terminal currently belongs, wherein the cell is from a network comprising a plurality of cells, the position information is from a plurality of position information of the plurality of cells, and the plurality of cells comprises a wireless area that is registered in the network, the mobile communication terminal comprising:

a communication section that receives, in each cell of the plurality of cells, the position information about the cell to which the mobile communication terminal currently belongs, and cell information for identifying the cell;

a storage section that associates and stores the position information and the cell information received in the communication section;

a counter that counts a number of handovers that take place upon a move between cells providing different cell information;

a global positioning system section that performs global positioning system positioning to be assisted by the position information stored in the storage section; and a control section that decides whether the position information stored in the storage section is valid or invalid, based on the number of handovers counted on the counter, wherein, if the number of handovers counted on the counter is equal to or greater than a threshold, the control section makes the communication section acquire new position information from the network, supply the new position information to the global positioning system section and store the new position information in the storage section, and, if the number of handovers counted on the counter is less than the threshold, supplies the position information stored in the storage section to the global positioning system section.

2. The mobile communication terminal according to claim 1, wherein, if the communication section acquires the new position information from the network, the counter resets the number of handovers.

3. The mobile communication terminal according to claim 1, wherein:

the storage section further stores surrounding cell information about surrounding cells located around the cell to which the mobile communication terminal currently belongs, in association with the position information and the cell information; and if the cell information or the surrounding cell information matches with received cell information of a new cell, the communication section does not reacquire the position information.

4. The mobile communication terminal according to claim 3, wherein, the communication section detects a handover from the cell to the new cell, and if after the communication section detects the handover, the new cell is covered in the surrounding cell information, the storage section uses the global positioning system positioning performed by the global positioning system section prior to the handover as new position information, and associates and stores the new position information and the surrounding cell information.

5. A mobile communication terminal that acquires position information of a cell to which the mobile communication terminal currently belongs, wherein the cell is from a network comprising a plurality of cells, the position information is from a plurality of position information of the plurality of cells, and the plurality of cells comprises a wireless area that is registered in the network, the mobile communication terminal comprising:

a communication section that receives, in each cell, the position information about the cell to which the mobile communication terminal currently belongs, cell information for identifying the cell, and surrounding cell information about surrounding cells located around the cell;

a storage section that associates and stores the position information, the cell information and the surrounding cell information received in the communication section;

a global positioning system section that performs global positioning system positioning to be assisted by the position information; and a control section that decides whether the position information stored in the storage section is valid or invalid, based on a result of comparison between cell information about a new cell, received in the communication section, and the cell information and the surrounding cell information stored in the storage section, wherein, if the cell information about the new cell, received in the communication section, is different from both the cell information and the surrounding cell information stored in the storage section, the control section makes the communication section acquire new position information from the network, supply the new position information to the global positioning system section, and store the new position information in the storage section, and, if the cell information about the new cell, received in the communication section, is the same as one of the cell information and the surrounding cell information stored in the storage section, supplies position information associated with the cell information or the surrounding cell information stored in the storage section, to the global positioning system section.

6. The mobile communication terminal according to claim 5, wherein, the communication section detects a handover form the cell to the new cell, and if after the communication section detects the handover, the new cell is covered in the surrounding cell information, the storage section uses the global positioning system positioning performed by the global positioning system section prior to the handover as new position information, and associates and stores the new position information and the surrounding cell information.

7. A positioning method for a mobile communication terminal that acquires position information of a cell to which the mobile communication terminal currently belongs, wherein the cell is from a network comprising a plurality of cells, the position information is from a plurality of position information of the plurality of cells, and the plurality of cells comprises a wireless area that is registered in the network, the positioning method comprising:

receiving, in each cell of the plurality of cells, the position information about the cell to which the mobile communication terminal currently belongs, and cell information for identifying the cell;

associating and storing the position information and the cell information received in the receiving;

counting a number of handovers that take place upon a move between cells providing different cell information;

performing global positioning system positioning to be assisted by the position information; and deciding whether the position information stored in the storing step is valid or invalid, based on the number of handovers, wherein:

if the number of handovers counted is equal to or greater than a threshold:

new position information is acquired from the network, global positioning system positioning is performed based on the new position information, and the new position information is stored, and, if the number of handovers counted is less than the threshold, global positioning system positioning is performed based on previously stored position information.

8. A positioning method for a mobile communication terminal that acquires position information of a cell to which the mobile communication terminal currently belongs, wherein the cell is from a network comprising a plurality of cells, the position information is from a plurality of position information of the plurality of cells, and the plurality of cells comprises a wireless area that is registered in the network, the positioning method comprising:

receiving, in each cell of the plurality of cells, the position information of a cell to which the mobile communication terminal currently belongs, cell information for identifying the cell, and surrounding cell information about surrounding cells located around the cell;

associating and storing the position information, the cell information and the surrounding cell information, received in the receiving;

performing global positioning system positioning to be assisted by the position information; and deciding whether the position information stored is valid or invalid, based on a result of comparison between received cell information about a new cell, and at least one of the stored cell information and the stored surrounding cell information, wherein:

if the received cell information about the new cell is different from both the stored cell information and the stored surrounding cell information:

new position information is acquired from the network, global positioning system positioning is performed based on the new position information, and the new position information is stored, and, if the received cell information about the new cell is the same as at least one of previously stored cell information and previously stored surrounding cell information, global positioning system positioning is performed based on the position information associated with the previously stored cell information or the previously stored surrounding cell information.

* * * * *